(12) United States Patent
Morin et al.

(10) Patent No.: US 9,676,139 B2
(45) Date of Patent: Jun. 13, 2017

(54) METHOD FOR EJECTING A VESSEL CARRIED BY A MANDREL BY ABUTMENT OF AN EJECTION FACE AGAINST A BEARING FACE OF THE NECK ARRANGED UNDER THE MOUTH OF THE VESSEL

(71) Applicant: SIDEL PARTICIPATIONS, Octeville sur Mer (FR)

(72) Inventors: Stephane Morin, Octeville sur Mer (FR); Pierre Heuzebroc, Octeville sur Mer (FR)

(73) Assignee: SIDEL PARTICIPATIONS, Octeville sur Mer (FR)

( * ) Notice: Subject to any disclaimer, the term of this patent is extended or adjusted under 35 U.S.C. 154(b) by 0 days.

(21) Appl. No.: 14/909,790

(22) PCT Filed: Sep. 2, 2014

(86) PCT No.: PCT/EP2014/068567
§ 371 (c)(1),
(2) Date: Feb. 3, 2016

(87) PCT Pub. No.: WO2015/028679
PCT Pub. Date: Mar. 5, 2015

(65) Prior Publication Data
US 2016/0151955 A1 Jun. 2, 2016

(30) Foreign Application Priority Data
Sep. 2, 2013 (FR) ..................................... 13 58361

(51) Int. Cl.
*B65G 47/86* (2006.01)
*B29C 49/42* (2006.01)
(Continued)

(52) U.S. Cl.
CPC ........... *B29C 49/4205* (2013.01); *B25J 11/00* (2013.01); *B29C 49/68* (2013.01); *B29C 49/06* (2013.01);
(Continued)

(58) Field of Classification Search
CPC .. B65G 47/842; B65G 47/847; B65G 47/244; B65G 47/252; B65G 2201/0244; B23Q 1/00
(Continued)

(56) References Cited

U.S. PATENT DOCUMENTS 4,640,406 A * 2/1987 Willison ................. B41F 17/14
198/377.03
5,558,200 A * 9/1996 Whitby ................ B65G 17/323
198/470.1
(Continued)

FOREIGN PATENT DOCUMENTS

EP 2 626 177 A1 8/2013

OTHER PUBLICATIONS

International Search Report, dated Oct. 15, 2014, from corresponding PCT application.

*Primary Examiner* — James R Bidwell
(74) *Attorney, Agent, or Firm* — Young & Thompson

(57) ABSTRACT

A method for ejecting a vessel (12), carried by a transporting device (10), the vessel (12) being provided with a neck (16) including a mouth (18), the transporting device (10) including: —a mobile support (28); —a gripping mandrel (30) that grips by vertical engagement with the neck (16); —an ejection face (64) mounted on the mobile support (28), the gripping mandrel (30) being mounted vertically slidable relative to the ejection face (64) to allow the gripping mandrel (30) to be extracted from the neck (16) when it slides via contact between the ejection face (64) and a bearing face (24) of the neck (16); characterized in that the bearing face (24) of the neck (16) is formed by a shoulder face that protrudes radially towards the outside relative to the mouth (18) and is arranged under the mouth (18) in the vertical direction.

17 Claims, 6 Drawing Sheets

(51) Int. Cl.
    *B29C 49/68*     (2006.01)
    *B25J 11/00*     (2006.01)
    *B29C 49/06*     (2006.01)
    *B29K 67/00*     (2006.01)
    *B29K 105/00*     (2006.01)
    *B29L 31/00*     (2006.01)

(52) U.S. Cl.
    CPC .. *B29K 2067/003* (2013.01); *B29K 2105/258* (2013.01); *B29L 2031/7158* (2013.01)

(58) Field of Classification Search
    USPC ............ 198/470.1, 803.12, 377.1, 397, 379, 198/377.01
    See application file for complete search history.

(56) References Cited

U.S. PATENT DOCUMENTS

| | | | |
|---|---|---|---|
| 5,769,476 A * | 6/1998 | Lawn | B29C 49/4205 198/803.12 |
| 8,968,657 B2 * | 3/2015 | Brandlhuber | G01N 35/0099 220/756 |
| 2013/0200642 A1 | 8/2013 | Duclos et al. | |

\* cited by examiner

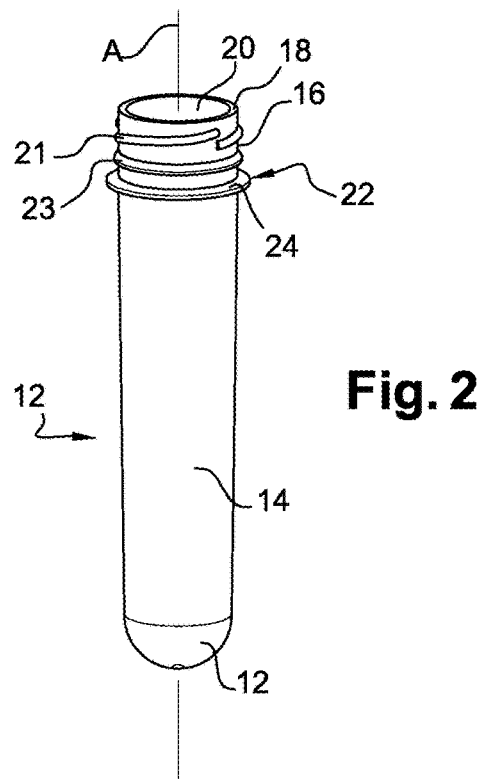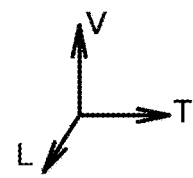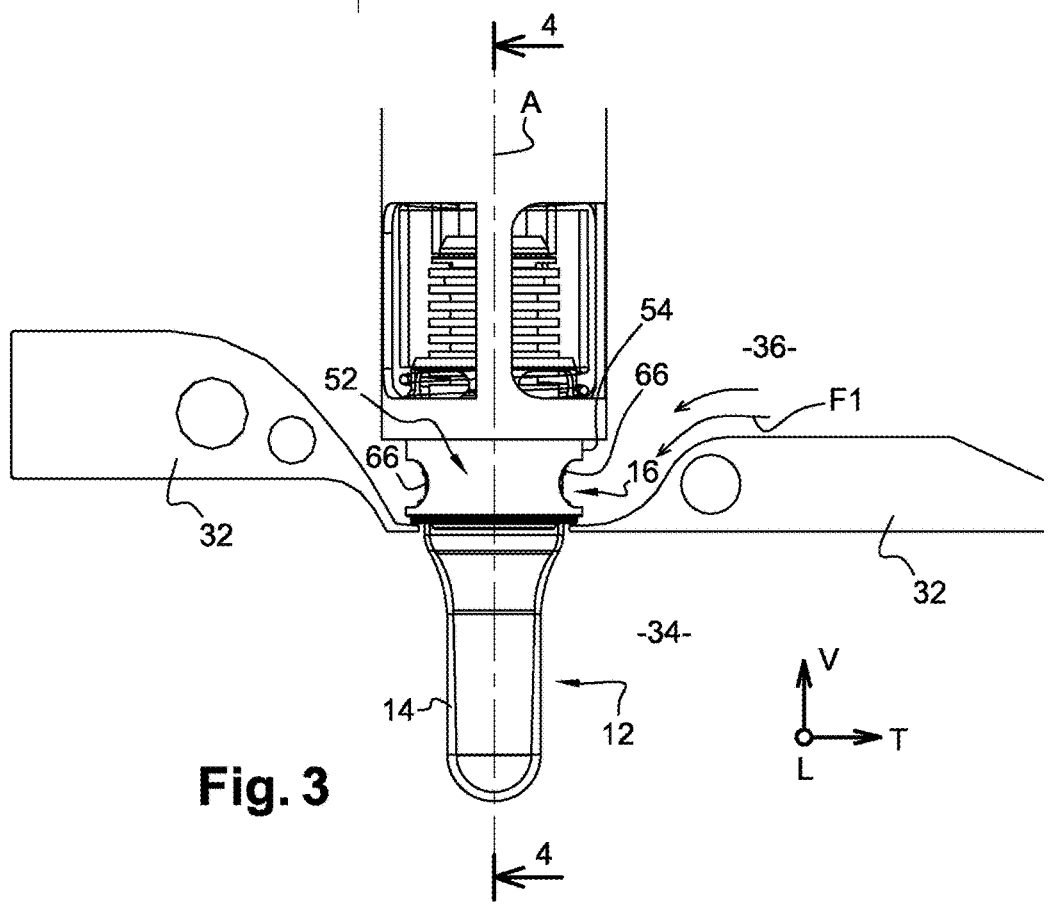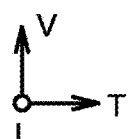

METHOD FOR EJECTING A VESSEL CARRIED BY A MANDREL BY ABUTMENT OF AN EJECTION FACE AGAINST A BEARING FACE OF THE NECK ARRANGED UNDER THE MOUTH OF THE VESSEL

TECHNICAL FIELD OF THE INVENTION

The invention relates to a method for ejecting a vessel, in particular a preform made of thermoplastic material, carried by a transport device, in which the vessel is provided with a cylindrical neck with a vertical axis comprising a free upper end edge called a mouth.

The invention also relates to a transport device that is suitable for implementing the ejection method carried out according to the teachings of the invention.

TECHNICAL BACKGROUND OF THE INVENTION

The invention relates more particularly to a method for ejecting a vessel, in particular a preform made of thermoplastic material, carried by a transport device, in which the vessel is provided with a cylindrical neck with a vertical axis that comprises a free upper end edge called a mouth, with the transport device comprising:

At least one movable support along a path;

At least one mandrel for gripping the vessel by vertical engagement with the neck, with the gripping mandrel being mounted to rotate on the movable support to make possible the rotation of the vessel around the axis of the neck during its transport;

A lower ejection face that is mounted on the movable support, with the gripping mandrel being mounted to slide vertically relative to the ejection face for making it possible to extract the gripping mandrel from the neck during relative sliding of it by bringing the ejection face into contact with an upper bearing face vertically opposite the neck, with the gripping mandrel sliding relative to the ejection face between a lower transport position in which the engagement of the gripping mandrel with the neck is made possible and an upper ejection position of the vessel in which the ejection face prevents the gripping mandrel from engaging with the neck by abutment against the bearing face of the neck.

It is known to manufacture vessels made of thermoplastic material by forming preforms, for example by blow molding or by stretch blow molding.

The preforms are in general manufactured by injection. A preform has a body that is intended to be stretched to be shaped into the final vessel during the forming operation. The neck of the preform already has its final shape. It is therefore important to protect the neck throughout the process for transformation of the preform into the final vessel.

To carry out the forming operation, it is necessary to heat in advance the bodies of the preforms at a glass transition temperature so as to make them malleable. The facilities for mass-producing vessels for this purpose comprise furnaces for heating preforms.

A heating furnace in general has the shape of a tunnel in which at least one of the walls comprises heating means. The preforms move along the tunnel in front of the heating means while turning round and round so that their bodies are heated in a uniform manner to a temperature that is suitable for the forming operation.

For this purpose, the furnace comprises a device for transporting preforms that in general come in the form of a closed chain, each link of which forms a movable support that is provided with means for gripping a preform.

Each preform is gripped by a mandrel that is engaged with the neck of the preform. The mandrel is, for example, formed by a mandrel with radial expansion that is forced into the neck of the preform.

At the outlet of the furnace, the preforms are transferred to a blow-molding station by means of a transfer wheel. During the passage of preforms from the furnace to the transfer wheel, the mandrels are extracted from the neck of the preforms so that the preforms are ejected from the transport device. The thus ejected preforms are received in suitable slots of the transfer wheel.

The machines for mass-producing vessels should allow preforms to move at high speed in the furnace. This involves being able to eject the preforms from their gripping mandrel at a fast enough rhythm not to slow down the movement of the preforms into the furnace.

In the known ejection methods, the movable support is provided with an ejection face that comes into contact with a portion of the mouth of the neck of the vessel when the ejection mandrel slides toward its upper position. The preform is then held in a lower position by the ejection face, while the mandrel continues its sliding toward its upper position until the extraction of the mandrel in the manner of a corkscrew is complete. This method is satisfactory because it makes possible a fast ejection of the preforms.

Nevertheless, the mouth is sometimes damaged by its contact with the ejection face.

In addition, the mouth is a portion of the neck that is likely to come into contact with the liquid that is contained in the final vessel. For certain contents of the vessel, in particular for food as contents, the vessel is to meet standards as regards its sterilization. However, the contact of the mouth with the ejection face may involve a risk of contamination of the liquid that is contained in the vessel. It is therefore sometimes required to sterilize the ejection face.

In addition, the mouth of the vessel is intended to come into contact with a face for positioning the mandrel to make possible an optimal positioning of the preform relative to the mandrel. This ensures that the preform thus occupies a vertical position that is determined relative to the mandrel, and this also ensures that the axis of the neck of the preform is perfectly coaxial with the axis of rotation of the mandrel.

The positioning face in general has an annular shape so as to come into contact with an inside annular portion of the mouth. This makes it possible to release an outside annular portion of the mouth for contact with the ejection face.

Nevertheless, it has been observed that the sharing of the mouth between its positioning function and its ejection function could result in poor ejection of the preform or poor positioning of the preform, in particular when the preform has a neck whose wall is very fine.

BRIEF SUMMARY OF THE INVENTION

The invention proposes a method for ejection of the type described above, characterized in that the bearing face of the neck is formed by a shoulder face that projects radially outward relative to the mouth and that is arranged below the mouth in the vertical direction.

According to another characteristic of the method, the bearing face of the neck is carried by a collar that delimits the neck relative to the rest of the vessel.

The invention also proposes a transport device for implementing the method according to the invention, with the transport device comprising:

A movable support along a path;

A mandrel for gripping the vessel that is intended to be vertically engaged with the neck, with the gripping mandrel being mounted to rotate on the movable support around its axis, the gripping mandrel comprising a lower face for vertical positioning of the vessel relative to the mandrel against which the mouth of the neck is intended to be supported vertically during its engagement;

A lower ejection face that is mounted on the movable support, with the gripping mandrel being mounted to slide vertically relative to the ejection face to make it possible to extract the mandrel totally from the neck during relative sliding of it by contact of the ejection face with an upper bearing face vertically opposite the neck, with the gripping mandrel sliding relative to the ejection face between a lower transport position in which the engagement of the gripping mandrel with the neck is made possible, and an upper position for ejection of the vessel in which the ejection face prevents the gripping mandrel from engaging with the neck by abutment against the bearing face of the neck; characterized in that in the transport position of the mandrel, the ejection face is arranged vertically below the positioning face of the mandrel.

According to other characteristics of the device:

The ejection face is mounted fixed in rotation relative to the movable support;

The gripping mandrel is mounted to slide vertically on the movable support between its lower transport position and its upper ejection position;

The ejection face is carried by a lower end annular edge of an ejection bell that is intended to cover the neck of the vessel when the mandrel occupies its lower transport position;

The ejection bell is mounted to slide vertically on the movable support between a lower position for covering the neck and an upper retracted position;

The sliding of the ejection bell is controlled by the sliding of the gripping mandrel toward an upper end position beyond its upper ejection position;

The ejection bell comprises a lower retraction face that is intended to come into contact with an upper face for control of the mandrel to make it possible to retract the bell toward its upper retracted position during the sliding of the mandrel toward its upper end position;

The ejection bell is forced into its lower covering position by an elastic return means that has an adequate stiffness for keeping the ejection bell in its lower covering position during the sliding of the mandrel from its lower transport position to its upper ejection position when a vessel is engaged with the mandrel;

The ejection bell comprises lateral aeration louvers.

BRIEF DESCRIPTION OF THE FIGURES

Other characteristics and advantages of the invention will emerge during the reading of the detailed description that will follow for the understanding of which reference will be made to the accompanying drawings in which:

FIG. 2 is a perspective view that shows a preform that is intended to be carried by the transport device of FIG. 1;

FIG. 3 is a front view that shows the transport device of FIG. 1;

DETAILED DESCRIPTION OF THE FIGURES

In the description below and in the claims, the following directions will be adopted in a nonlimiting manner:

Longitudinal, oriented from back to front in the direction of movement of the support of the transport device and indicated by the arrow "L" of the figures;

Vertical, oriented from bottom to top and indicated by the arrow "V" of the figures;

Transverse, oriented from left to right and indicated by the arrow "T" of the figures.

The vertical direction is used in a nonlimiting manner as a fixed geometric reference point relative to the axis of the mandrel and without reference to the direction of the gravity.

In the description below, elements that have an identical structure or analogous functions will be referred to by the same reference.

Figure 1:
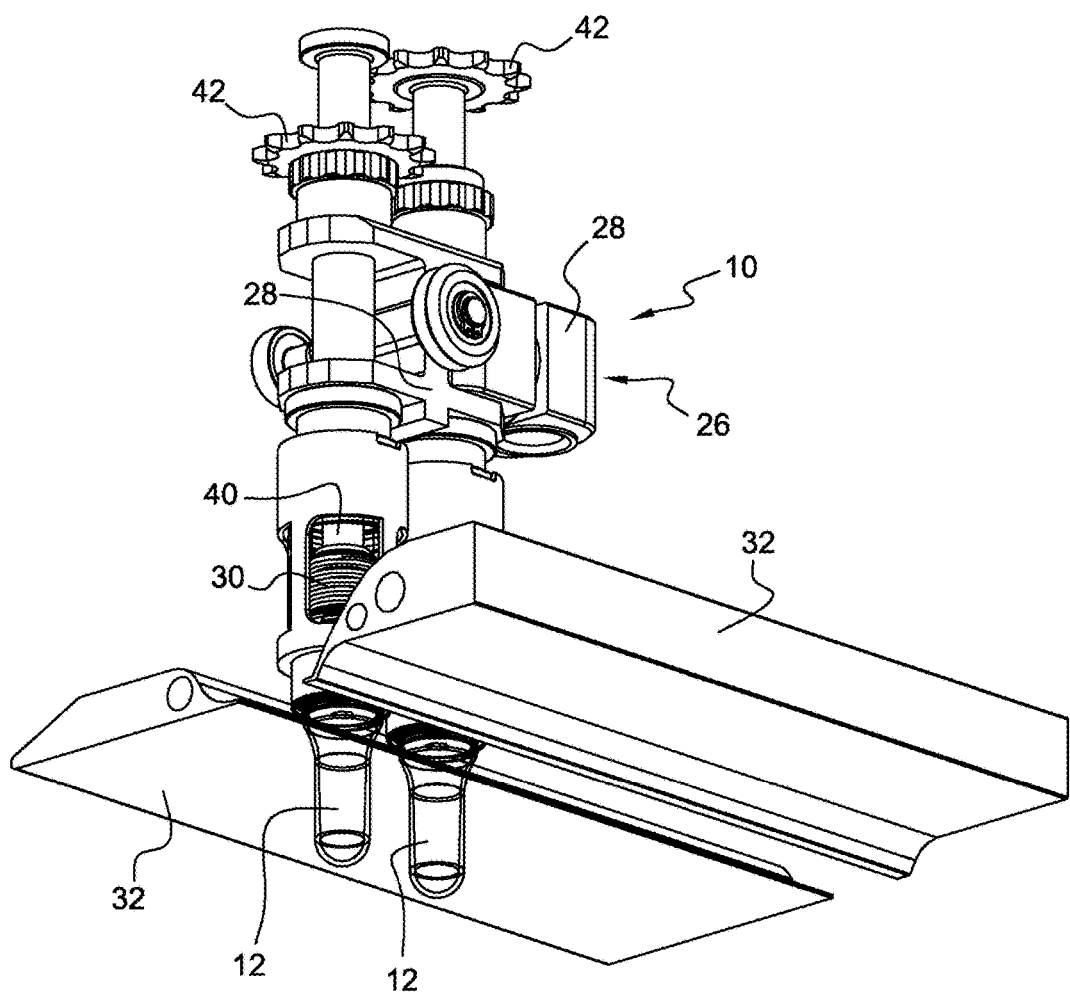
FIG. 1 is a perspective view that shows a portion of a transport device that is produced according to the teachings of the invention and that carries two preforms.

A section of a device 10 for transport of preforms 12 through a furnace (not shown) for heating preforms 12 was shown in FIG. 1. The furnace is part of a mass-production facility for vessels made of thermoplastic material. In a nonlimiting manner, the vessels here are bottles, and the thermoplastic material is formed by polyethylene terephthalate, referred to below under its acronym "PET."

The final vessels are produced by hot-forming of preforms 12 made of thermoplastic material. Below, the term "preform" 12 will be used to refer to the vessel before the forming stage. Such preforms 12 are in general produced by injection, and they cool down between when they are produced and when they pass into the heating furnace.

As shown in FIG. 2, the preform 12 has a cylindrical body 14 with a vertical main axis "A" with a tubular wall that is closed at its lower end. The body 14 is extended at its other upper end by a neck 16, itself also with a tubular wall with vertical axis "A." The neck 16 is in general injected in such a way as to already have its definitive shape while the body 14 of the preform 12 undergoes relatively significant deformation to form the final vessel during a subsequent forming stage.

The neck 16 is delimited vertically upward by an upper end circular edge called "mouth 18." The mouth 18 thus surrounds an upper opening 20 of the preform 12.

On its outside cylindrical face, the neck 16 comprises a threading 21 that projects radially to make possible the subsequent screwing of a cap.

As a variant of the invention that is not shown, the threading is replaced by radially-projecting lugs to make possible the elastic engagement of the cap.

The neck 16 is delimited vertically downward by a collar 22 that extends radially projecting outward relative to the mouth 18 and relative to the threading 21. The collar 22 is thus arranged vertically below the mouth 18. The collar 22 has an upper shoulder face that extends radially and that is turned upward. In this embodiment of the invention, the shoulder face will be called bearing face 24, as will be explained in detail below.

The neck 16 also comprises a collet 23 that is arranged parallel to and above the collar 22. The collet 23 projects radially outward relative to the mouth 18, but less than the collar 22. Thus, the collar 22 remains radially projecting relative to the collet 23. With the collar, the collet 23 thus vertically delimits a groove that is intended to accommodate a tamper-proof ring of a cap for final closing of the vessel.

The transport device 10 of FIG. 1 is intended to move preforms 12 along a determined path through the heating furnace. The preforms 12 are intended to be heated along this path.

The transport device 10 comprises a conveyor chain 26 forming a closed loop. As shown in FIG. 1, the conveyor chain 26 is formed by joining links. Each link forms a movable support 28 that comprises at least one mandrel 30 for gripping a preform 12.

The chain 26 comprises numerous links and numerous gripping mandrels 30. Only one section of the conveyor chain 26 comprising two movable supports 28 and two gripping mandrels 30 was shown in FIG. 1 for the sake of clarity. With all of the gripping mandrels being essentially identical, a single one of these gripping mandrels 22 will be described below.

As is shown in FIG. 1, the path of the preforms 12 in the furnace is bordered by two longitudinal rails 32. These rails 32 have in particular the function of limiting the heating of the necks 16, and in particular the collar 22, so as to preserve their integrity. Thus, as shown in FIG. 3, the rails 32 delimit a lower space 34 of the furnace that is heated by heating means (not shown), and an upper space 36 of the furnace that is ventilated and cooled for keeping the neck 16 of the preforms 12 at a moderate temperature. For this purpose, as indicated by the arrows "F1," fresh air is blown transversely into the upper space 36 by ventilation means (not shown).

It will be understood that the terms "upper" and "lower" are used according to the vertical orientation of the gripping mandrel 30, with the invention being applicable to transport devices making it possible to invert preforms by pivoting movable supports 28 around a longitudinal axis.

The transport device 10 will now be described in more detail with reference to FIGS. 4 to 7.

The movable support 28 comprises a fixed sleeve 38. The sleeve 38 has a vertical main axis "A" that is coaxial to the axis of the neck 16 when the preform 12 is transported by the transport device 10.

The gripping mandrel 30 is attached to the lower end of an upper shaft 40 with a vertical axis "A" that is coaxial to the axis of the neck 16 when the preform 12 is transported by the transport device 10.

The shaft 40 is mounted to rotate inside the sleeve 38. Thus, the gripping mandrel 30 is mounted to rotate on the movable support 28 to make it possible for the preform 12 to rotate around the axis "A" of its neck 16 during its transport. For this purpose, an upper end of the shaft 40 is coupled to an upper pinion 42 for controlling the rotation, as shown in FIG. 1. The pinion 42 is intended to work with a fixed rack (not shown) that is installed along the path.

Figure 4:
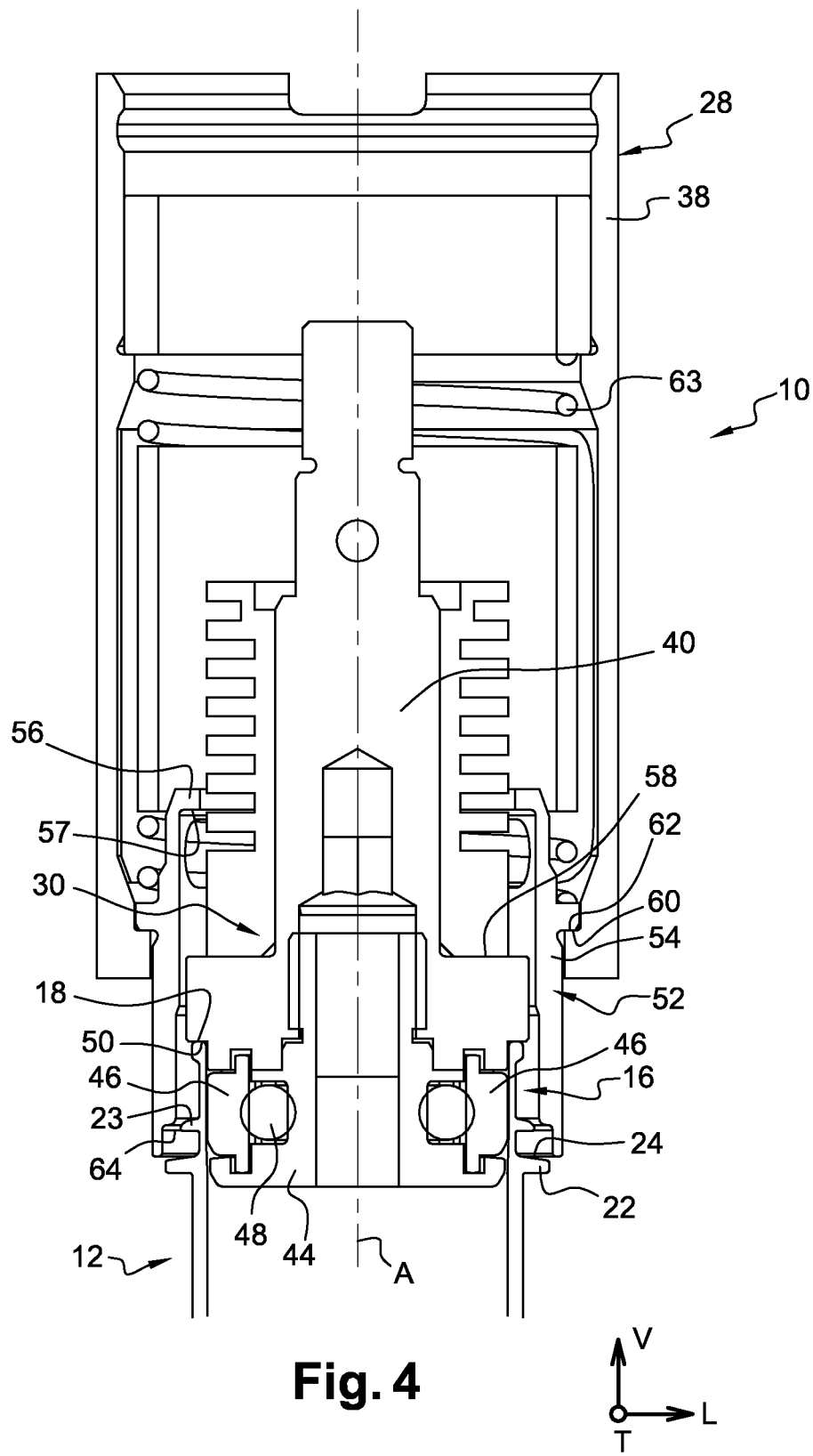
FIG. 4 is an axial cutaway view along the cutting plane 4-4 of FIG. 3 that shows a mandrel of the transport device in a position for transport of a preform, with an ejection bell being in a position for covering the neck of the preform.

As shown in FIG. 4, the mandrel 30 is intended to be engaged vertically with the neck 16.

This is a mandrel 30 with radial expansion that is forced inside the neck 16 through the upper opening 20 of the preform 12.

For this purpose, the mandrel 30 comprises a cylindrical head 44 with a vertical axis "A" whose outside diameter is slightly less than the inside diameter of the neck 16 in such a way that there is still radial sliding play between the head 44 and the neck 16 when the head 44 is shrunk-on in the neck 16.

The mandrel 30 also comprises jaws 46, here three in number, which come in the form of ring sectors. Each jaw 46 is accommodated sliding radially into a radial housing of the head 44 between:

A position that is retracted toward the axis "A" of the head making possible the vertical sliding of the gripping mandrel 30 relative to the neck 16;

And a radial expansion position in which they are able to be tightened against the inside cylindrical face of the neck 16 for holding the preform 12 by friction.

The head section 44 comprising the jaws 46 thus forms an active section that is able to lock the preform 12.

The jaws 46 are elastically forced toward their expansion position, here by means of an elastic ring 48 that is inserted radially between the bottom of the housing and the jaw 46.

The lower end edge of each jaw 46 has a beveled edge for facilitating the shrinking-on by force of the gripping mandrel 30 in the neck 16 of the preform.

The invention can also be applied to mandrels of the same type whose radial expansion is controlled between a locking position and a release position of the neck.

As a variant, not shown, the mandrel is an outside mandrel that is intended to grip the neck by its outside cylindrical face. The neck is then engaged in the mandrel.

The head 44 is delimited vertically upward by an upper section of larger diameter delimiting an annular shoulder face that is turned downward and that forms a lower positioning face 50 against which the mouth 18 is accommodated in vertical abutment during the shrinking-on of the head 44 in the neck 16. This positioning face 50 makes it possible to position the preform 12 relative to the movable support 28 while ensuring the coaxiality between the axis "A" of the neck 16 and the axis "A" of the mandrel 30.

To ensure an optimal positioning of the preform 12 relative to the gripping mandrel 30, the positioning face 50 has a radial width that is at least equal to the radial thickness of the mouth 18. Nevertheless, the collar 22 of the neck 16 remains radially projecting relative to the positioning face 50 when the preform 12 is engaged with the mandrel 30.

Before their entry into the furnace, the preforms 12 are mounted on a rotary transfer wheel (not shown) in such a way that the preforms 12 are positioned at a distance under the mandrel 30. In this embodiment, the transfer wheel does not make it possible to mount the preforms 12 toward the gripping mandrel 30. To make possible the automatic engagement of the gripping mandrel 30 in the neck 16 of the preform 12, the gripping mandrel 30 is mounted here to slide vertically in the sleeve 38 of the movable support 28 between:

An upper end position in which the gripping mandrel 30 is arranged at a distance above the neck 16 when the preform 12 is mounted on the transfer wheel;

And a lower end position for transport in which the gripping mandrel 30 is likely to be forced into the neck 16 of the preform 12 when the preform is mounted on the transfer wheel.

The sliding of the gripping mandrel 30 between its two end positions is generally controlled by a cam (not shown) that is arranged along the path of the movable support 28 and that acts on an upper end of the shaft 40.

At the outlet of the furnace, the hot preform 12 is to be ejected from the transport device 10 to be transferred to a forming station, for example a blow-molding station. To ensure a quick and reliable ejection of the preform 12, the gripping mandrel 30 also comprises means for ejecting the preform 12. These ejection means are intended to extract the gripping mandrel 30 from the neck 16.

The ejection means comprise an ejection bell 52 that is mounted to slide vertically in the sleeve 38 of the movable support 28 between a lower position for covering the neck 16, and an upper retracted position. The ejection bell 52 is fixed in rotation relative to the movable support 28.

The ejection bell 52 has a cylindrical skirt 54 with an axis "A" that is coaxial to that of the gripping mandrel 30. The skirt 54 is interposed radially with play of the two sides between the head 44 of the gripping mandrel 30 and the sleeve 38. The gripping mandrel 30 is housed in the ejection bell 52.

The upper end of the skirt 54 has an annular flange 56 that extends radially toward the inside above the gripping mandrel 30. This flange 56 surrounds the central shaft 40 of the gripping mandrel 30. The inside face, called the retraction face 57, of the flange 56 is intended to come into vertical abutment against an upper radial face 58 opposite the gripping mandrel 30 to limit the relative slide of the gripping mandrel 30 upward relative to the ejection bell 52. As will be explained in more detail below, the sliding of the ejection bell 52 is thus controlled by the sliding of the gripping mandrel 30 toward its upper end position by raising the ejection bell 52 by its flange 56.

In addition, the ejection bell 52 also has a lower stopping face 60 that extends radially outward from the outside cylindrical face of the skirt 54. This stopping face 60 is intended to come into contact against a face 62 that is vertically opposite the sleeve 38 for limiting the downward sliding of the ejection bell 52 into its covering position relative to the movable support 28. The stopping face 60 is formed here by the lower annular face of a ring that extends radially outward from the outside cylindrical face of the skirt 54.

The ejection bell 52 is elastically forced toward its lower covering position. For this purpose, elastic return means, are provided here formed by a helical spring 63 that is interposed between the upper face of the outside ring of the bell 52 and a face opposite the movable support 28.

The skirt 54 comprises a lower ejection face 64. The ejection face 64 is carried here by a lower end annular edge of the ejection bell 52. The ejection face 64 is intended to be arranged vertically opposite the bearing face 24 of the collar 22 of the neck 16.

The annular ejection face 64 of the bell 52 has an inside diameter that is greater than the outside diameter of the mouth 18. More particularly, the ejection face 64 has here an inside diameter that is larger than the outside diameter of the collet 23. In addition, the vertical height between the ejection face 64 and the flange 56 of the ejection bell 52 is greater than the height of the neck 16 between the bearing face 24 and the mouth 18. Thus, the ejection bell 52 has a shape such that when the ejection face 64 is applied vertically against the bearing face 24 of the collar 22, the bell 52 covers the entire neck 16, without coming into contact with the mouth 18 or with any element of the neck 16 other than the collar 22.

In a lower transport position of the gripping mandrel 30, the ejection bell 52 is forced toward its covering position. In this position, the ejection face 64 of the ejection bell 52 is arranged vertically below the face 50 for positioning the gripping mandrel 30. Thus, the ejection face 64 is in the immediate proximity of the collar 22, making possible a quick ejection of the preform 12 at the furnace outlet, as will be explained in more detail below.

However, in a lower transport position of the gripping mandrel 30, vertical play is made between the ejection face 64 and the collar 22 to make possible the rotation of the preform 12 without friction on the ejection bell 52, while the ejection bell 52 remains fixed in rotation relative to the movable support 28.

According to a variant of the invention, not shown, the bearing face of the neck is formed by the upper face of the collet.

As shown in FIG. 4, during the transport of the preform 12, the ejection bell 52 covers the neck 16, thus providing to the neck 16 thermal protection against the heat of the furnace.

Nevertheless, for making it possible to cool the neck 16 by the ventilation air, the skirt 54 of the ejection bell 52 is perforated with lateral aeration louvers 66, as is shown in FIG. 3. The lateral louvers 66 are open transversely on both sides of the skirt 54 to allow the transverse passage of the ventilation air.

The method for ejecting the preform 12 using the above-described transport device 10 will now be described.

Figure 5:
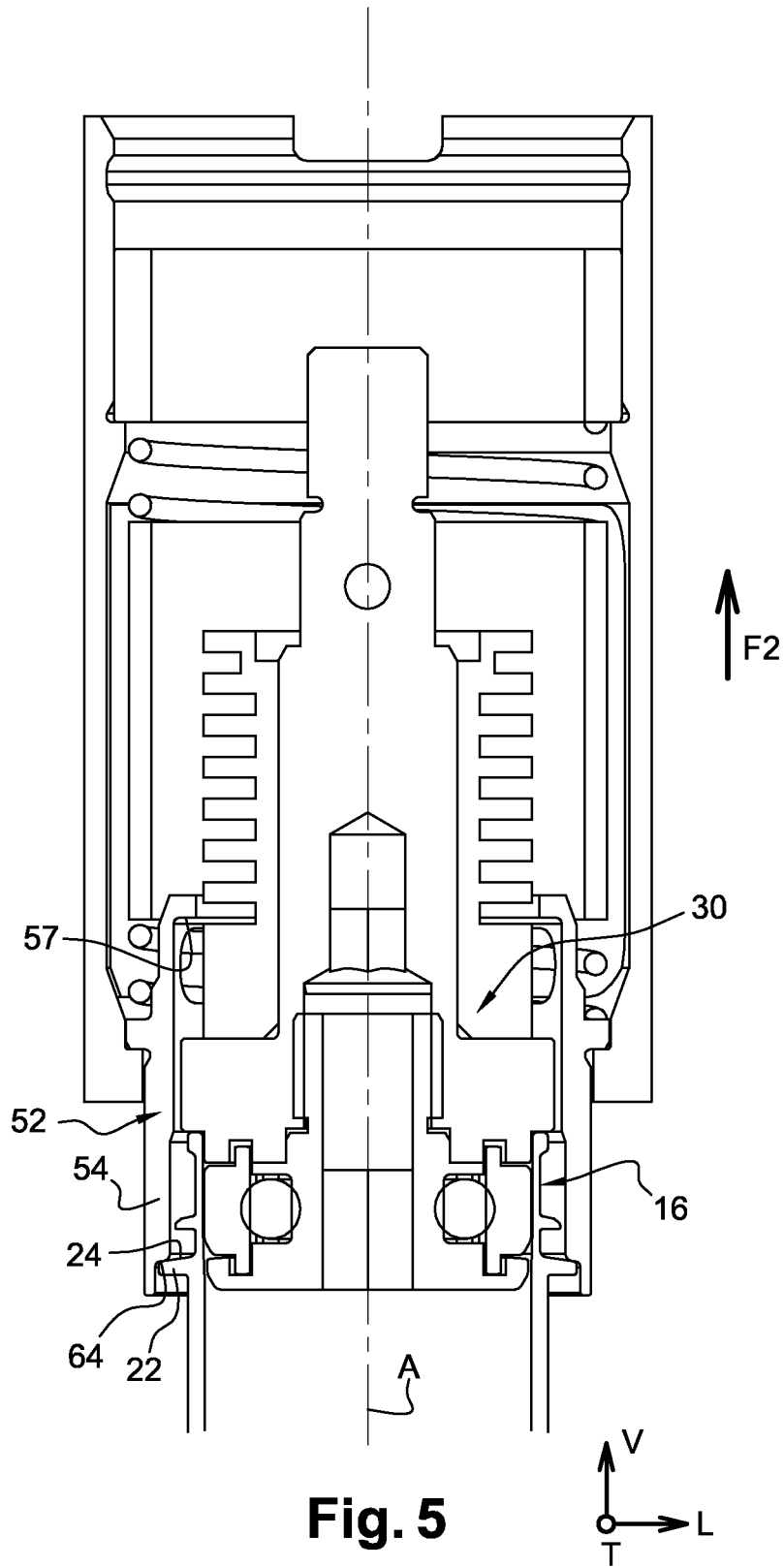
FIG. 5 is a view similar to the one of FIG. 4, which shows the beginning of an upward slide of the mandrel, with a collar of the neck abutting against an ejection face of the ejection bell in its covering position.

As shown in FIG. 5, the gripping mandrel 30 is controlled by sliding toward its upper end position, as indicated by the arrow "F2." With the preform 12 always being engaged with the gripping mandrel 30, the neck 16 is also slid vertically upward until the bearing face 24 of the collar 22 abuts against the ejection face 64 of the ejection bell 52. The ejection bell 52 is thus in contact only with the bearing face 24 of the collar 22, with the mouth 18 of the neck 16 being in contact only with the positioning face 50 of the gripping mandrel 30.

Figure 6:
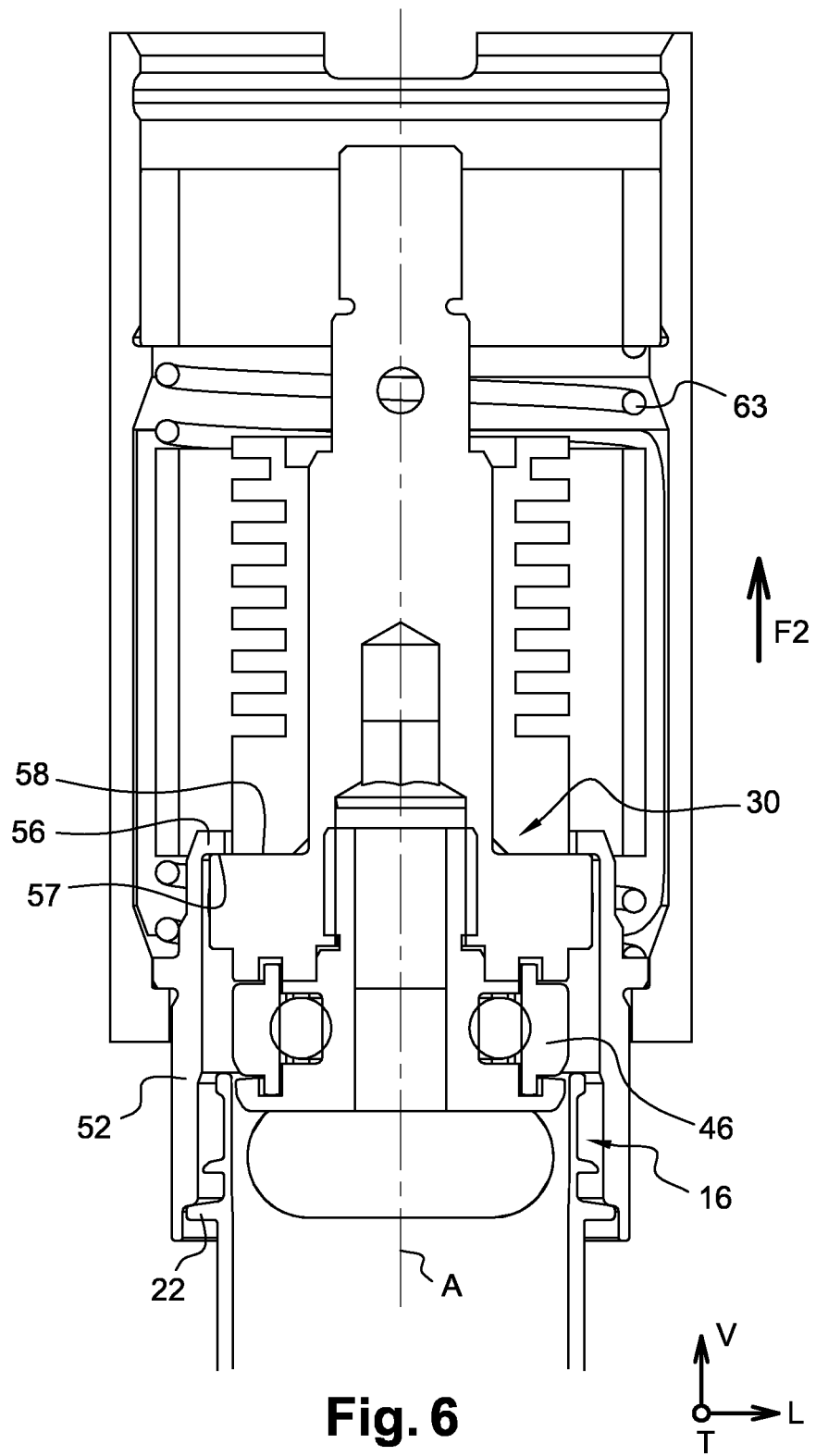
FIG. 6 is a view similar to the one of FIG. 4, which shows the mandrel in an upper ejection position in which the mandrel is extracted from the neck of the preform, the neck having been held by the ejection bell in covering position.

The upward sliding of the gripping mandrel 30 continues, as indicated by the arrow "F2" of FIG. 6. By so doing, the collar 22 tends to rest vertically against the ejection face 64 of the ejection bell 52. The spring 63 has an adequate stiffness for opposing the movement of the ejection bell 52. The spring 63 more particularly opposes a force that is greater than the friction force that is exerted by the jaws 46 of the gripping mandrel 30 against the inside cylindrical face of the neck 16.

Thus, the preform 12 is held by the ejection bell 52 while the sliding of the gripping mandrel 30 continues. The gripping mandrel 30, or at least its active section, is thus entirely extracted from the neck 16 of the preform when the mandrel 30 reaches an upper ejection position. This upper ejection position is intermediate between the lower end position for transport and the upper end position. The preform 12 is then no longer held by the gripping mandrel 30.

In an upper ejection position of the gripping mandrel 30, the engagement of the gripping mandrel 30 in the neck 16 of the preform is thus prevented by the ejection face 64 of the ejection bell 52.

In the embodiment shown in the figures, the preform 12 is ejected above a location for receiving a transfer wheel (not shown). The preform 12 is then mounted on the transfer wheel by means of its collar 22.

In this ejection position, the upper face 58 of the gripping mandrel 30 enters into contact with the upper flange 56 of the ejection bell 52. The ejection bell 52 always occupies its lower covering position under the action of the spring 63.

Figure 7:
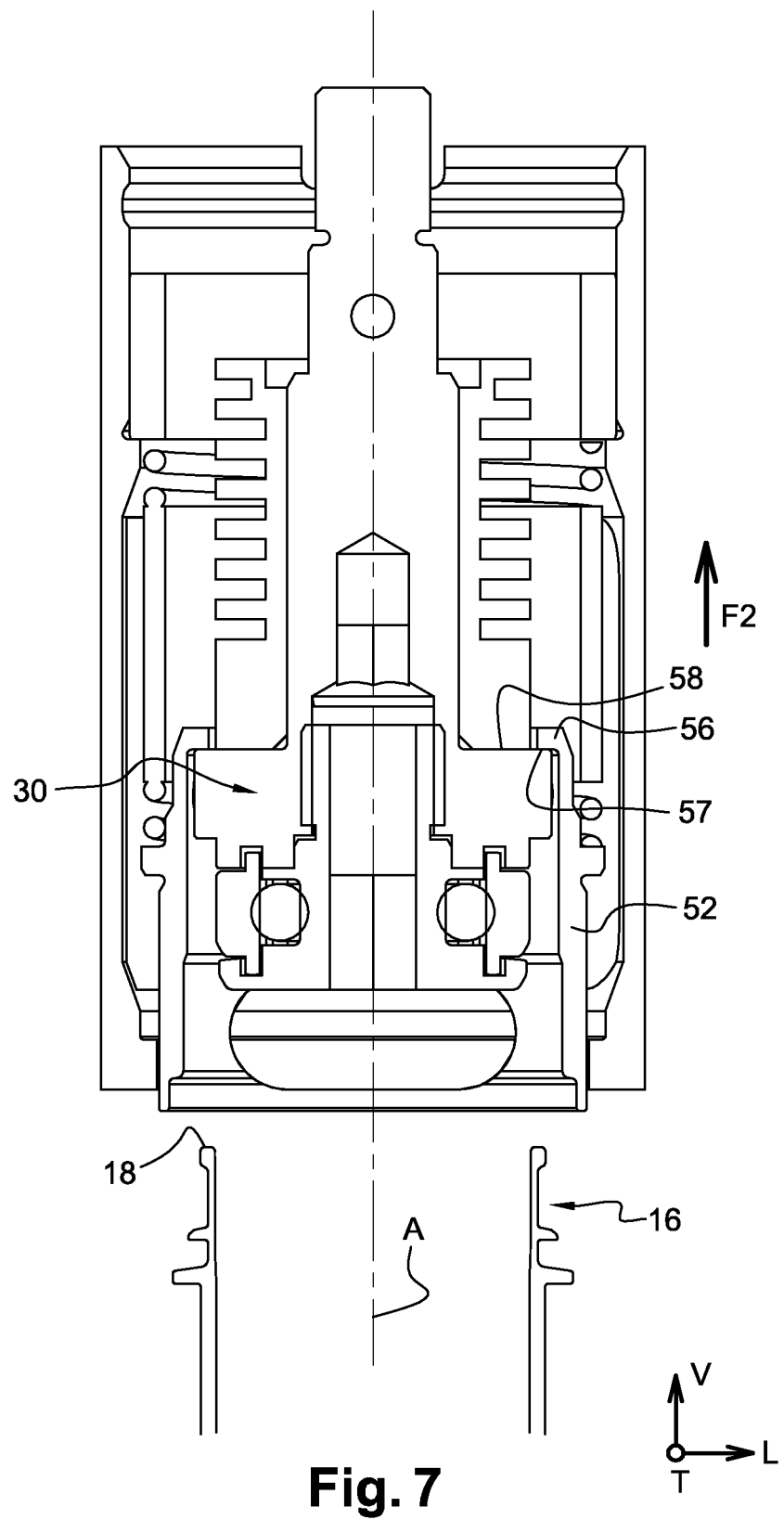
FIG. 7 is a view similar to the one of FIG. 4, which shows the mandrel in an upper end position in which the ejection bell is raised in a retracted position relative to the neck of the preform.

The transfer wheel is intended to evacuate the preform 12 laterally relative to the axis "A" of the gripping mandrel 30. However, with the bell 52 occupying its covering position, the skirt 54 prevents the preform 12 from being released laterally. To make possible the lateral evacuation of the preform 12, the gripping mandrel 30 continues its vertical sliding upward to its upper end position as shown in FIG. 7. By so doing, the gripping mandrel 30 raises the ejection bell 52 toward its upper position, which is retracted by means of the flange 56.

In this retraction position of the ejection bell 52, the lower end edge of the bell 52 is raised vertically above the mouth 18 of the neck 16. The preform 12 is then free to be evacuated laterally relative to the transport device 10, as indicated by the arrow "F3" of FIG. 7.

The ejection method carried out according to the teachings of the invention and the transport device 10 for its implementation make it possible to eject the preforms 12 in a reliable and fast manner while making possible an optimal positioning of the preform 12 on the gripping mandrel 30.

In addition, the ejection bell 52 makes it possible, besides its ejection function, to protect more effectively the neck 16 of the preform 12 from inadvertent heating. The ejection bell 52 thus makes it possible to ensure a more effective protection of the neck 16 for preserving its integrity.

The invention claimed is:

1. A method for ejecting a vessel (12), in particular a preform (12) made of thermoplastic material, carried by a transport device (10), in which the vessel (12) is provided with a cylindrical neck (16) with a vertical axis (A) that comprises a free upper end edge called a mouth (18), with the transport device (10) comprising:
    at least one movable support (28) along a path;
    at least one mandrel (30) provided with a radial expansion for gripping the vessel (12) by vertical engagement of said radial expansion that is forced into the neck (16);
    a lower ejection face (64) that is mounted on the movable support (28), with the gripping mandrel (30) being mounted to slide vertically relative to the ejection face (64) for making it possible to extract the gripping mandrel (30) from the neck (16) during relative sliding of it by bringing the ejection face (64) into contact with an upper bearing face (24) vertically opposite the neck (16), with the gripping mandrel (30) sliding relative to the ejection face (64) between a lower transport position in which the engagement of the gripping mandrel (30) with the neck (16) is made possible, and an upper ejection position of the vessel (12) in which the ejection face (64) prevents the gripping mandrel (30) from engaging with the neck (16) by abutment against the bearing face (24) of the neck (16),
    wherein the bearing face (24) of the neck (16) is formed by a shoulder face that projects radially outward relative to the mouth (18) and that is arranged below the mouth (18) in the vertical direction.

2. The method according to claim 1, wherein the bearing face (24) of the neck (16) is carried by a collar (22) that delimits the neck (16) relative to the rest of the vessel (12).

3. A transport device (10) for ejecting a vessel (12), in particular a preform (12) made of thermoplastic material, carried by the transport device (10), in which the vessel (12) is provided with a cylindrical neck (16) with a vertical axis (A) that comprises a free upper end edge called a mouth (18), the transport device (10) comprising:
    at least one movable support (28) along a path;
    at least one mandrel (30) provided with a radial expansion for gripping the vessel (12) by vertical engagement of said radial expansion that is forced into the neck (16);
    a lower ejection face (64) that is mounted on the movable support (28), with the gripping mandrel (30) being mounted to slide vertically relative to the ejection face (64) for making it possible to extract the gripping mandrel (30) from the neck (16) during relative sliding of it by bringing the ejection face (64) into contact with an upper bearing face (24) vertically opposite the neck (16), with the gripping mandrel (30) sliding relative to the ejection face (64) between a lower transport position in which the engagement of the gripping mandrel (30) with the neck (16) is made possible, and an upper ejection position of the vessel (12) in which the ejection face (64) prevents the gripping mandrel (30) from engaging with the neck (16) by abutment against the bearing face (24) of the neck (16),
    wherein the bearing face (24) of the neck (16) is formed by a shoulder face that projects radially outward relative to the mouth (18) and that is arranged below the mouth (18) in the vertical direction,
    a movable support (28) along a path;
    a mandrel (30) for gripping the vessel (12) that is intended to be vertically engaged with the neck (16), with the gripping mandrel (30) being mounted to rotate on the movable support (28) around its axis (A), the gripping mandrel (30) comprising a lower face (50) for vertical positioning of the vessel (12) relative to the mandrel (30) against which the mouth (18) of the neck (16) is intended to be supported vertically during its engagement; and
    a lower ejection face (64) that is mounted on the movable support (28), with the gripping mandrel (30) being mounted to slide vertically relative to the ejection face (64) to make it possible to extract the mandrel (30) totally from the neck (16) during relative sliding of it by contact of the ejection face (64) with an upper bearing face (24) vertically opposite the neck (16), with the gripping mandrel (30) sliding relative to the ejection face (64) between a lower transport position in which the engagement of the gripping mandrel (30) with the neck (16) is made possible, and an upper position for ejection of the vessel (12) in which the ejection face (64) prevents the gripping mandrel (30) from engaging with the neck (16) by abutment against the bearing face (24) of the neck (16);
wherein in the transport position of the mandrel (30), the ejection face (64) is arranged vertically below the positioning face (50) of the mandrel (30).

4. The device (10) according to claim 3, wherein the ejection face (64) is mounted fixed in rotation relative to the movable support (28).

5. The device (10) according to claim 3, wherein the gripping mandrel (30) is mounted to slide vertically on the movable support (28) between its lower transport position and its upper ejection position.

6. The device (10) according to claim 3, wherein the ejection face (64) is carried by a lower end annular edge of an ejection bell (52) that is intended to cover the neck (16) of the vessel (12) when the mandrel (30) occupies its lower transport position.

7. The device (10) according to claim 6, wherein the ejection bell (52) is mounted to slide vertically on the movable support (28) between a lower position for covering the neck (16) and an upper retracted position.

8. The device (10) according to claim 7, wherein the sliding of the ejection bell (52) is controlled by the sliding of the gripping mandrel (30) toward an upper end position beyond its upper ejection position.

9. The device (10) according to claim 8, wherein the ejection bell (52) comprises a lower retraction face (57) that is intended to come into contact with an upper face (58) for control of the mandrel (30) for making possible the retraction of the bell (52) toward its retracted upper position during the sliding of the mandrel (30) toward its upper end position.

10. The device according to claim 9, wherein the ejection bell (52) is forced into its lower covering position by an elastic return means (63) that has an adequate stiffness for keeping the ejection bell (52) in its lower covering position during the sliding of the mandrel (30) from its lower transport position to its upper ejection position when a vessel (12) is engaged with the mandrel (30).

11. The device (10) according to claim 6, wherein the ejection bell (52) comprises lateral aeration louvers (66).

12. The device (10) according to claim 4, wherein the gripping mandrel (30) is mounted to slide vertically on the movable support (28) between its lower transport position and its upper ejection position.

13. The device (10) according to claim 4, wherein the ejection face (64) is carried by a lower end annular edge of an ejection bell (52) that is intended to cover the neck (16) of the vessel (12) when the mandrel (30) occupies its lower transport position.

14. The device (10) according to claim 5, wherein the ejection face (64) is carried by a lower end annular edge of an ejection bell (52) that is intended to cover the neck (16) of the vessel (12) when the mandrel (30) occupies its lower transport position.

15. The device (10) according to claim 6, wherein the ejection bell (52) is mounted to slide vertically on the movable support (28) between a lower position for covering the neck (16) and an upper retracted position.

16. The device (10) according to claim 15, wherein the sliding of the ejection bell (52) is controlled by the sliding of the gripping mandrel (30) toward an upper end position beyond its upper ejection position.

17. A transport device for ejecting a vessel (12) carried by a transport device (10), in which the vessel (12) is provided with a cylindrical neck (16) with a vertical axis (A) that comprises a free upper end edge called a mouth (18), the transport device (10) comprising:

at least one movable support (28) along a path;
at least one mandrel (30) for gripping the vessel (12) by vertical engagement with the neck (16);
a lower ejection face (64) that is mounted on the movable support (28), with the gripping mandrel (30) being mounted to slide vertically relative to the ejection face (64) for making it possible to extract the gripping mandrel (30) from the neck (16) during relative sliding of it by bringing the ejection face (64) into contact with an upper bearing face (24) vertically opposite the neck (16), with the gripping mandrel (30) sliding relative to the ejection face (64) between a lower transport position in which the engagement of the gripping mandrel (30) with the neck (16) is made possible, and an upper ejection position of the vessel (12) in which the ejection face (64) prevents the gripping mandrel (30) from engaging with the neck (16) by abutment against the bearing face (24) of the neck (16),
wherein the bearing face (24) of the neck (16) is formed by a shoulder face that projects radially outward relative to the mouth (18) and that is arranged below the mouth (18) in the vertical direction;
a movable support (28) along a path;
a mandrel (30) for gripping the vessel (12) that is intended to be vertically engaged with the neck (16), with the gripping mandrel (30) being mounted to rotate on the movable support (28) around its axis (A), the gripping mandrel (30) comprising a lower face (50) for vertical positioning of the vessel (12) relative to the mandrel (30) against which the mouth (18) of the neck (16) is intended to be supported vertically during its engagement; and
a lower ejection face (64) that is mounted on the movable support (28), with the gripping mandrel (30) being mounted to slide vertically relative to the ejection face (64) to make it possible to extract the mandrel (30) totally from the neck (16) during relative sliding of it by contact of the ejection face (64) with an upper bearing face (24) vertically opposite the neck (16), with the gripping mandrel (30) sliding relative to the ejection face (64) between a lower transport position in which the engagement of the gripping mandrel (30) with the neck (16) is made possible, and an upper position for ejection of the vessel (12) in which the ejection face (64) prevents the gripping mandrel (30) from engaging with the neck (16) by abutment against the bearing face (24) of the neck (16),
wherein in the transport position of the mandrel (30), the ejection face (64) is arranged vertically below the positioning face (50) of the mandrel (30),
wherein the ejection face (64) is carried by a lower end annular edge of an ejection bell (52) that is intended to cover the neck (16) of the vessel (12) when the mandrel (30) occupies its lower transport position, and
wherein the ejection bell (52) comprises lateral aeration louvers (66).

* * * * *